United States Patent
Seo et al.

(10) Patent No.: US 9,408,168 B2
(45) Date of Patent: Aug. 2, 2016

(54) METHOD AND APPARATUS FOR TRANSMITTING SYNCHRONIZATION SIGNAL IN CARRIER AGGREGATION SYSTEM

(75) Inventors: Dong Youn Seo, Anyang-si (KR); Joon Kui Ahn, Anyang-si (KR); Min Gyu Kim, Anyang-si (KR); Suck Chel Yang, Anyang-si (KR); Bong Hoe Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 199 days.

(21) Appl. No.: 14/113,983

(22) PCT Filed: Apr. 27, 2012

(86) PCT No.: PCT/KR2012/003326
§ 371 (c)(1),
(2), (4) Date: Oct. 25, 2013

(87) PCT Pub. No.: WO2012/148236
PCT Pub. Date: Nov. 1, 2012

(65) Prior Publication Data
US 2014/0050206 A1 Feb. 20, 2014

Related U.S. Application Data

(60) Provisional application No. 61/479,855, filed on Apr. 28, 2011, provisional application No. 61/591,280, filed on Jan. 27, 2012, provisional application No. 61/615,854, filed on Mar. 26, 2012.

(51) Int. Cl.
*H04W 56/00* (2009.01)
*H04L 5/00* (2006.01)
*H04J 11/00* (2006.01)

(52) U.S. Cl.
CPC ......... *H04W 56/001* (2013.01); *H04J 11/0069* (2013.01); *H04J 11/0083* (2013.01); *H04L 5/001* (2013.01); *H04L 5/0048* (2013.01); *H04W 56/00* (2013.01)

(58) Field of Classification Search
CPC .. H04W 56/00; H04J 11/0083; H04J 11/0069
See application file for complete search history.

(56) References Cited

U.S. PATENT DOCUMENTS

| | | | |
|---|---|---|---|
| 2009/0042532 A1* | 2/2009 | Bienas | H04W 24/00 455/403 |
| 2010/0265870 A1 | 10/2010 | Cai et al. | |

(Continued)

FOREIGN PATENT DOCUMENTS

| | | | |
|---|---|---|---|
| KR | 1020090131621 A | 12/2009 | |
| KR | 1020100012037 A | 2/2010 | |
| KR | 20110029180 A | 3/2011 | |

OTHER PUBLICATIONS

International Search Report from PCT/KR2012/003326, dated Nov. 12, 2012.

*Primary Examiner* — Marcus R Smith
*Assistant Examiner* — Syed S Ali
(74) *Attorney, Agent, or Firm* — Dentons US LLP

(57) ABSTRACT

Provided is a method and an apparatus for transmitting a synchronization signal in a carrier aggregation system. The method comprises: transmitting via a first serving cell a synchronization signal setting information with regard to a second serving cell; and transmitting the synchronization signal via the second serving cell, wherein the synchronization signal is variably set by means of the synchronization signal setting information.

8 Claims, 17 Drawing Sheets

(56) References Cited

U.S. PATENT DOCUMENTS

| | | | | |
|---|---|---|---|---|
| 2011/0013592 A1* | 1/2011 | Uemura | ................ | H04W 24/10 370/331 |
| 2011/0230208 A1* | 9/2011 | Kangas | ................ | H04W 64/00 455/456.1 |
| 2011/0243005 A1* | 10/2011 | Sun | ........................ | H04L 5/001 370/252 |
| 2011/0312316 A1* | 12/2011 | Baldemair | .............. | H04L 5/001 455/422.1 |
| 2012/0307670 A1* | 12/2012 | Kazmi | .................. | H04W 24/10 370/252 |
| 2013/0242880 A1* | 9/2013 | Miao | ....................... | H04L 5/001 370/329 |
| 2013/0308595 A1* | 11/2013 | Ratasuk | ................ | H04W 16/06 370/330 |
| 2014/0044105 A1* | 2/2014 | Bontu | .................... | H04L 5/001 370/336 |
| 2014/0378157 A1* | 12/2014 | Wei | ....................... | H04W 16/14 455/454 |

\* cited by examiner

METHOD AND APPARATUS FOR TRANSMITTING SYNCHRONIZATION SIGNAL IN CARRIER AGGREGATION SYSTEM

This Application is a 35 U.S.C. §371 National Stage Entry of International Application No. PCT/KR2012/003326, filed Apr. 27, 2012 and claims the benefit of U.S. Provisional Application Nos. 61/479,855, filed Apr. 28, 2011, 61/591,280, filed Jan. 27, 2012, and 61/615,854, filed Mar. 26, 2012, all of which are incorporated by reference in their entirety herein.

BACKGROUND OF THE INVENTION

1. Field of the Invention

The present invention relates to wireless communications, and more particularly, to a method and apparatus for transmitting a synchronization signal in a carrier aggregation system.

2. Related Art

A carrier aggregation system has recently drawn attention. The carrier aggregation system implies a system that configures a broadband by aggregating one or more component carriers (CCs) having a bandwidth smaller than that of a target broadband when the wireless communication system intends to support the broadband. In the carrier aggregation system, a term 'serving cell' is also used instead of the CC. Herein, the serving cell consists of a downlink component carrier (DL CC) and an uplink component carrier (UL CC), or consists of only the DL CC. That is, the carrier aggregation system is a system in which a plurality of serving cells are assigned to one user equipment.

Conventionally, the carrier aggregation system transmits a synchronization signal in all serving cells by considering backward compatibility, and has the same structure in a frame in which the synchronization signal is transmitted. Herein, the synchronization signal implies a signal used for frame synchronization, cell identifier (ID) acquisition, etc.

However, a further carrier aggregation system can use a new carrier type without consideration of backward compatibility. That is, a transmission method different from the conventional synchronization signal transmission can be used in the new carrier type.

SUMMARY OF THE INVENTION

The present invention provides a method and apparatus for transmitting a synchronization signal in a carrier aggregation system.

According to one aspect of the present invention, a method of transmitting a synchronization signal in a carrier aggregation system is provided. The method includes: transmitting synchronization signal configuration information for a second serving cell through a first serving cell; and transmitting the synchronization signal through the second serving cell, wherein the synchronization signal is flexibly determined according to the synchronization signal configuration information.

In the aforementioned aspect of the present invention, the first serving cell may be a primary cell in which a user equipment performs an initial connection establishment procedure or a connection re-establishment procedure with respect to a base station.

In addition, the second serving cell may be a secondary cell added to the primary cell.

In addition, the synchronization signal configuration information may include at least one of a bandwidth, a transmission time, and a hopping pattern of a synchronization signal transmitted in the second serving cell.

In addition, the method may further include transmitting information on at least one of a cell identifier (ID), a bandwidth, a frame boundary, and a cyclic prefix (CP) length of the second serving cell through the first serving cell.

In addition, a first synchronization signal transmitted in the first serving cell may include a primary synchronization signal (PSS) having a sequence length of 63 and a secondary synchronization signal (SSS) having a sequence length of 31. A second synchronization signal transmitted in the second serving cell may consist of only any one of the PSS and the SSS.

In addition, the synchronization signal configuration information may include an offset value, and the offset value may indicate an amount by which a position in a frame of a second synchronization signal transmitted in the second serving cell is shifted in a time domain with respect to a position in a frame of a first synchronization signal transmitted in the first serving cell.

In addition, the offset value may be given in a unit of subframe or orthogonal frequency division multiplexing (OFDM) symbol.

In addition, the method may further include transmitting information indicating whether a broadcast channel is transmitted in the second serving cell through the first serving cell. Information indicating a frame boundary of the second serving cell may be transmitted in the broadcast channel.

In addition, the broadcast channel may be transmitted in four OFDM symbols consecutive to a synchronization signal transmitted in the second serving cell.

According to another aspect of the present invention, a method for an initial access of a user equipment is provided. The method includes: detecting a synchronization signal in a serving cell; estimating a position of a broadcast channel transmitted in the serving cell on the basis of the synchronization signal; receiving frame boundary information indicating a frame boundary of the serving cell in the estimated broadcast channel; and determining the frame boundary of the serving cell by decoding the frame boundary information, wherein a position at which the synchronization signal is transmitted is flexibly determined among a plurality of candidate positions in a frame of the serving cell.

In the aforementioned aspect of the present invention, the frame boundary information may indicate a relative position of a frame boundary of the serving cell with respect to a transmission position of the synchronization signal.

In addition, a synchronization signal transmitted in the serving cell may include a PSS having a sequence length of 63 and an SSS having a sequence length of 31.

According to another aspect of the present invention, there is provided a user equipment including: a radio frequency (RF) unit for transmitting and receiving a radio signal; and a processor operatively coupled to the RF unit, wherein the processor receives synchronization signal configuration information for a second serving cell through a first serving cell, and receives the synchronization signal through the second serving cell, and wherein the synchronization signal is flexibly determined according to the synchronization signal configuration information.

According to the present invention, transmission of a synchronization signal of a serving cell can be flexibly determined in a carrier aggregation system. Therefore, an interference caused by the synchronization signal can be controlled between systems which use different radio access technologies (RATs). In addition, not only a serving cell conforming to a specific synchronization signal transmission protocol but also a new type of serving cell not conforming to the specific synchronization signal transmission protocol can also be used as a secondary cell. In addition, resource utilization efficiency of the secondary cell is also increased.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

A communication from the BS to the UE is called a downlink (DL), and a communication from the UE to the BS is called an uplink (UL). A wireless communication system including the BS and the UE may be a time division duplex (TDD) system or a frequency division duplex (FDD) system. The TDD system is a wireless communication system for performing UL and DL transmission/reception by using different times at the same frequency band. The FDD system is a wireless communication system capable of simultaneously performing UL and DL transmission/reception by using different frequency bands. The wireless communication system can perform communication by using a radio frame.

Figure 1:
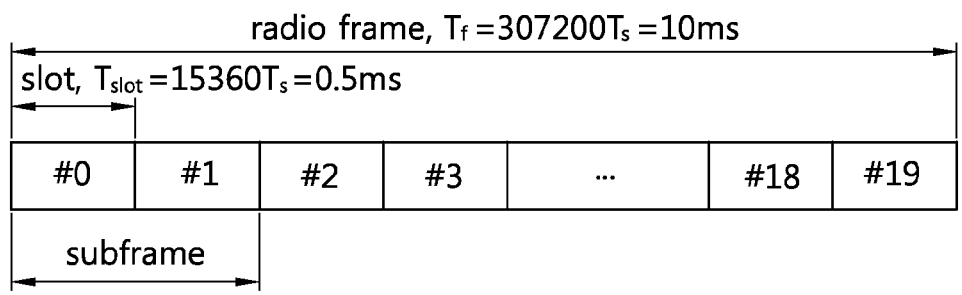
FIG. 1 shows a structure of a frequency division duplex (FDD) radio frame.

FIG. 1 shows a structure of an FDD radio frame.

The FDD radio frame (hereinafter, simply referred to as FDD frame) includes 10 subframes. One subframe includes two consecutive slots. Slots included in the FDD frame are indexed from 0 to 19. A time required to transmit one subframe is defined as a transmission time interval (TTI). The TTI may be a minimum scheduling unit. For example, one subframe may have a length of 1 milliseconds (ms), and one slot may have a length of 0.5 ms.

Figure 2:
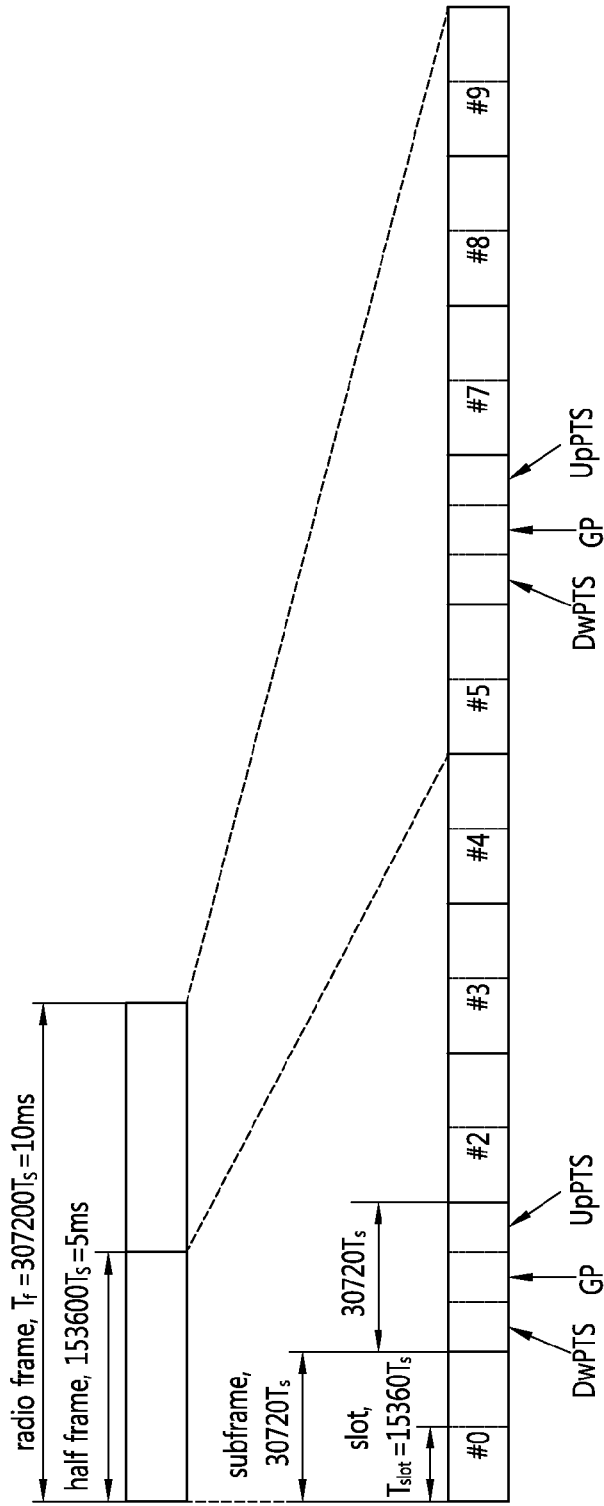
FIG. 2 shows a structure of a time division duplex (TDD) radio frame.

FIG. 2 shows a structure of a TDD radio frame.

Referring to FIG. 2, the TDD radio frame (hereinafter, TDD frame) includes 10 subframes. When subframes of the TDD frame are indexed starting from 0, a subframe having an index #1 and an index #6 is called a special subframe (simply referred to as an S subframe), and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink. The GP and the UpPTS take a role of a time gap.

In the TDD frame, a downlink (DL) subframe and an uplink (UL) subframe coexist. Table 1 below shows an example of a UL-DL configuration of a radio frame.

TABLE 1

| Uplink-downlink configuration | Downlink-to-Uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, 'D' denotes a DL subframe, 'U' denotes a UL subframe, and 'S' denotes a special subframe. Upon receiving the DL-UL configuration from the BS, the UE can know whether each subframe is a DL subframe or a UL subframe in the TDD subframe.

Figure 3:
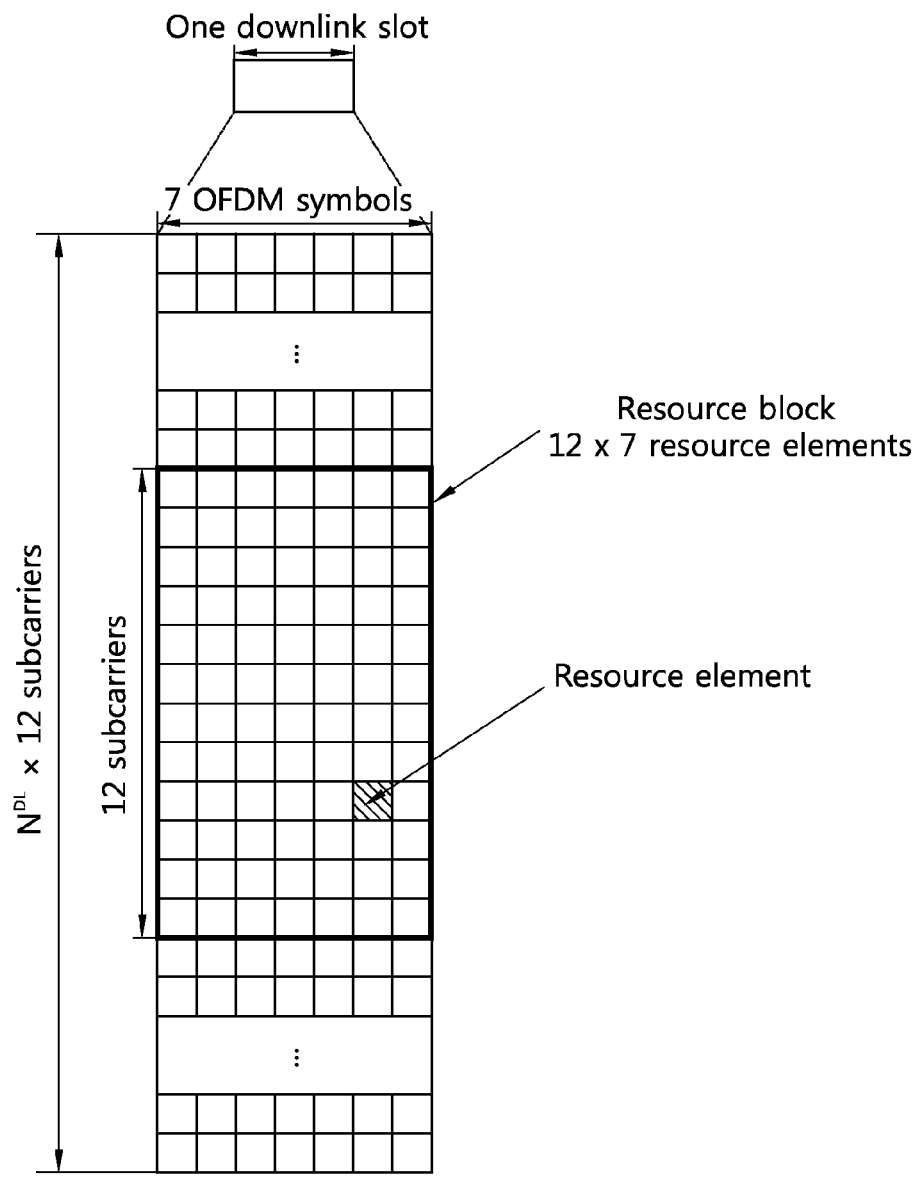
FIG. 3 shows an example of a resource grid for one downlink (DL) slot.

FIG. 3 shows an example of a resource grid for one DL slot.

Referring to FIG. 3, the DL slot includes a plurality of orthogonal frequency division multiplexing (OFDM) symbols in a time domain, and includes $N_{RB}$ resource blocks (RBs) in a frequency domain. The RB is a resource allocation unit, and includes one slot in the time domain and includes a plurality of subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and $l(l=0, \ldots, 6)$ denotes an OFDM symbol index in the time domain.

Although it is described in FIG. 3 that one resource block includes 7×12 REs consisting of 7 OFDM symbols in the time domain and 12 subcarriers in the frequency domain for example, the number of OFDM symbols and the number of subcarriers in the resource block are not limited thereto. The number of OFDM symbols and the number of subcarriers may change variously depending on a cyclic prefix (CP) length, a frequency spacing, etc. For example, if the CP length corresponds to an extended CP, the resource block includes 6 OFDM symbols. The number of subcarriers in one OFDM symbol may be selected from 128, 256, 512, 1024, 1536, and 2048.

Figure 4:
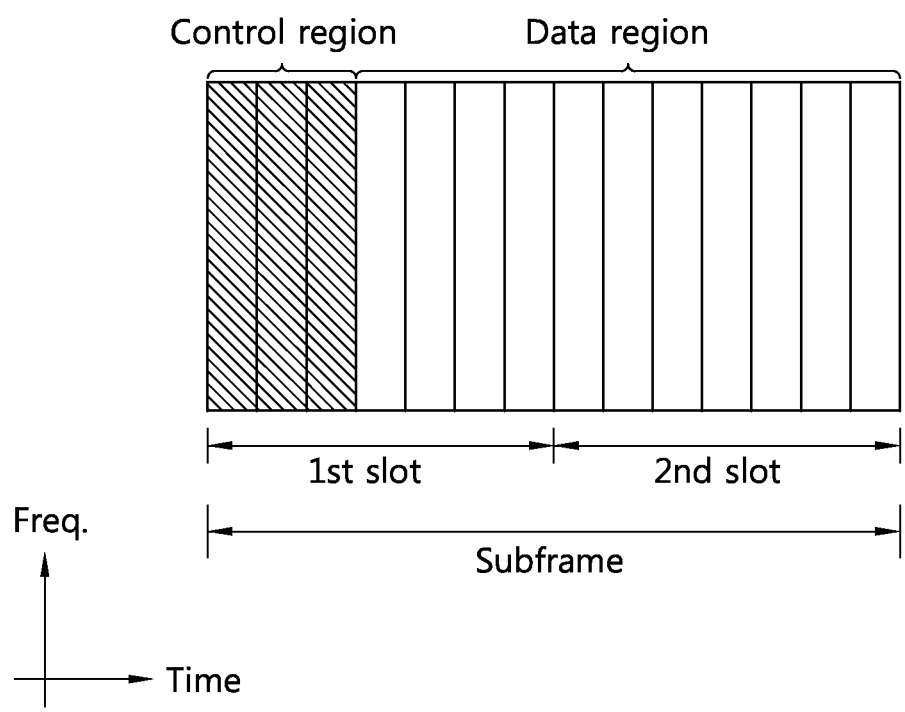
FIG. 4 shows a structure of a DL subframe.

FIG. 4 shows a structure of a DL subframe.

Referring to FIG. 4, the DL subframe is divided into a control region and a data region in the time domain. The control region includes up to three (optionally, up to four) preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

A physical control format indicator channel (PCFICH) transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

A physical hybrid-ARQ indicator channel (PHICH) carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The BS determines a PDCCH format according to DCI to be transmitted to the UE, attaches a cyclic redundancy check (CRC) to the DCI, and masks a unique identifier (referred to as a radio network temporary identifier (RNTI)) to the CRC according to an owner or usage of the PDCCH.

If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. When the C-RNTI is used, the PDCCH carries control information for a specific UE (such information is called UE-specific control information), and when another RNTI is used, the PDCCH carries common control information received by all or a plurality of UEs in a cell.

The BS encodes the CRC-attached DCI to generate coded data. The encoding includes channel encoding and rate matching. Thereafter, the BS modulates the coded data to generate modulation symbols, and transmits the modulation symbols by mapping the symbols to a physical resource element (RE).

A PDSCH transmitted in the data region is a downlink data channel. System information, data, etc., can be transmitted through the PDSCH. In addition, the PBCH carries system information necessary for communication between the UE and the BS. The system information transmitted through the PBCH is referred to as a master information block (MIB). In comparison thereto, system information transmitted on the PDCCH is referred to as a system information block (SIB).

Figure 5:
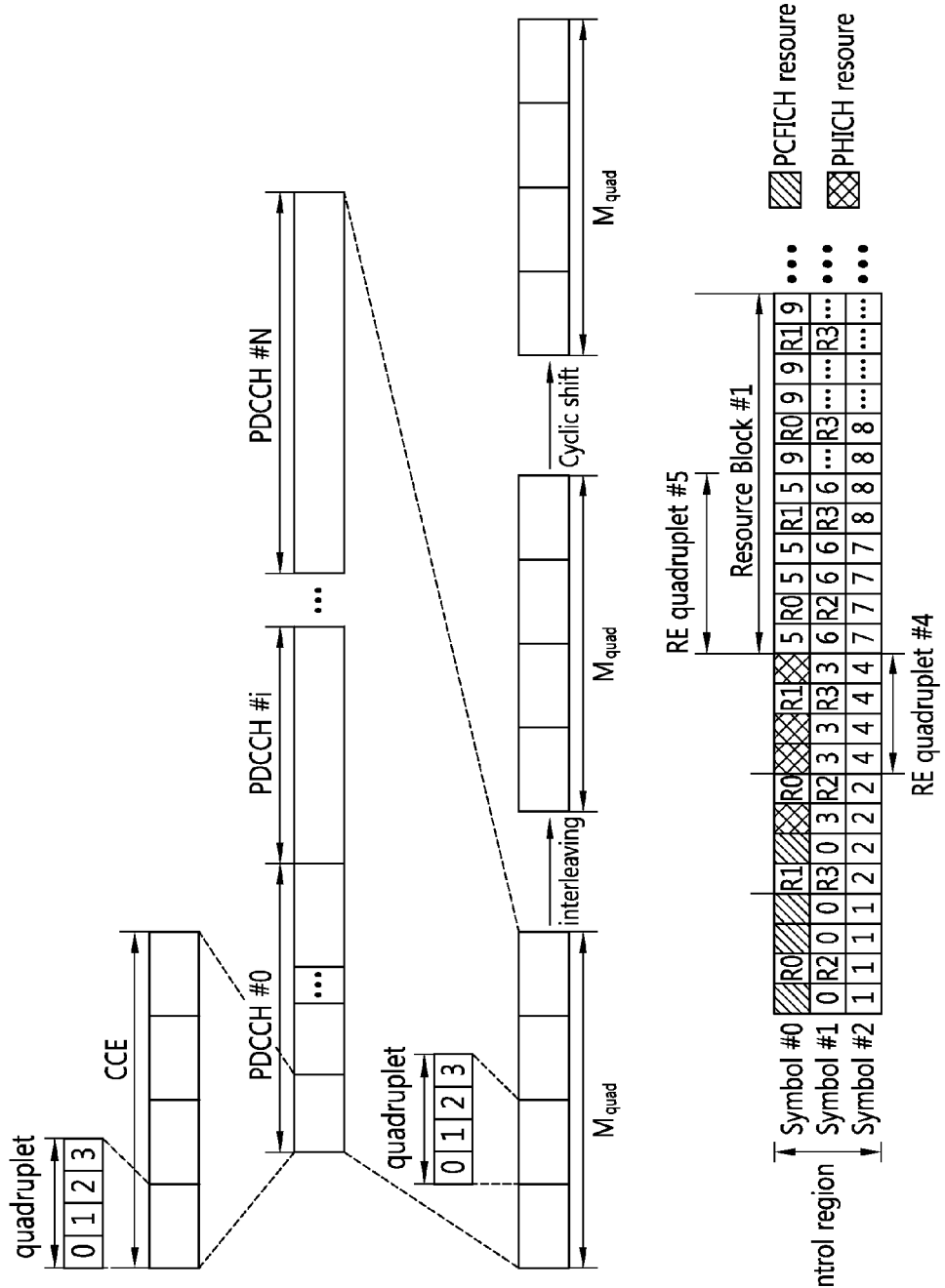
FIG. 5 shows an example of resource mapping of a physical downlink control channel (PDCCH).

FIG. 5 shows an example of resource mapping of a PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). One REG (indicated by a quadruplet in the drawing) includes 4 REs. One CCE includes 9 REGs. The REG may consist of 4 REs excluding an RE to which a reference signal is mapped. In FIG. 5, R0 denotes a reference signal of a $1^{st}$ antenna port. R1 denotes a reference signal of a $2^{nd}$ antenna port. R2 denotes a reference signal of a $3^{rd}$ antenna port. R3 denotes a reference signal of a $4^{th}$ antenna port. In this case, the REG consists of 4 REs excluding REs marked with R0 to R3.

According to an association relation of the number of CCEs and the coding rate provided by the CCEs, a PDCCH format and the number of available bits of the PDCCH are determined. The number of CCEs used to configure one PDCCH may be selected from a set $\{1, 2, 4, 8\}$. Each element of the set $\{1, 2, 4, 8\}$ is referred to as a CCE aggregation level.

A control channel consisting of one or more CCEs performs interleaving in an REG unit, and is mapped to a physical resource after performing cyclic shift based on a cell identifier (ID).

Figure 6:
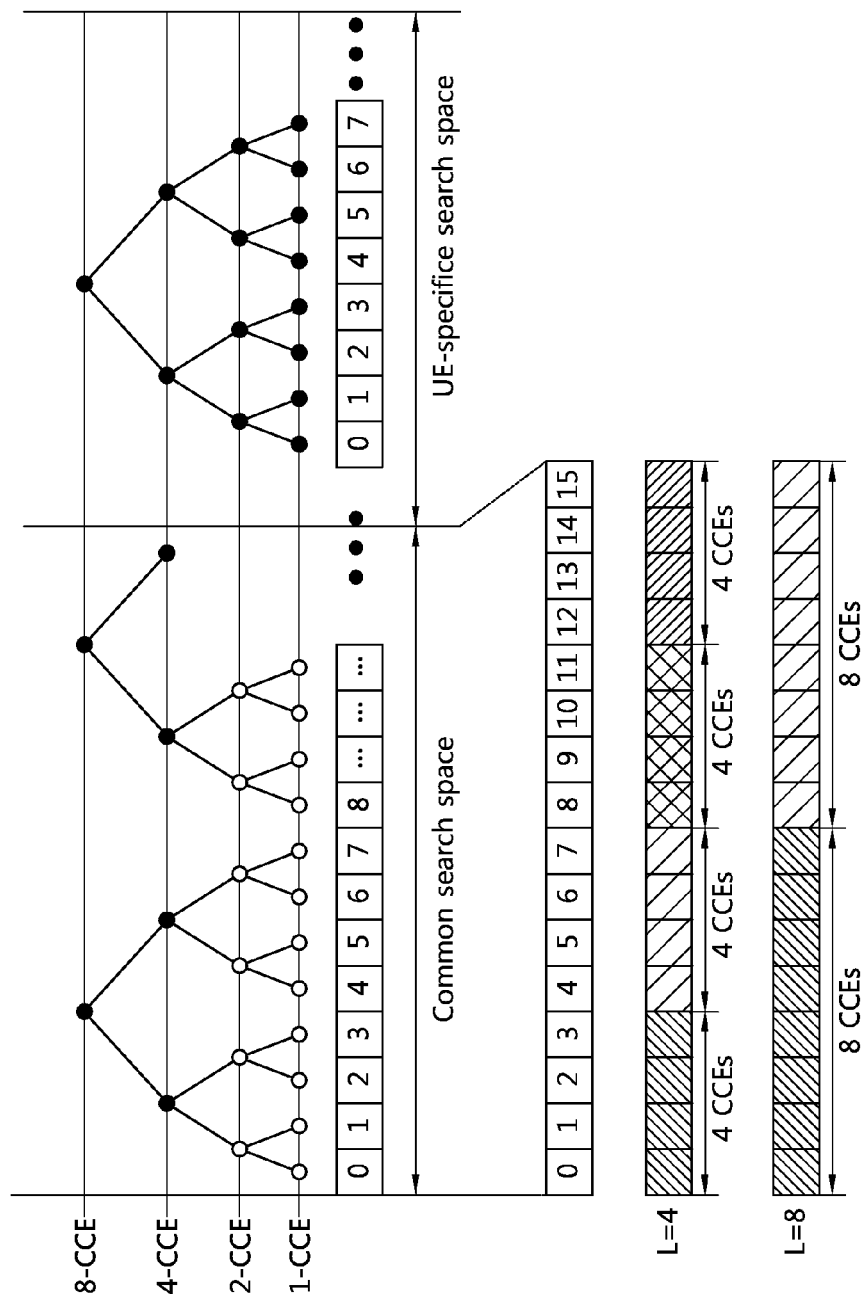
FIG. 6 shows an example of a search space when a user equipment (UE) monitors a PDCCH.

FIG. 6 shows an example of a search space when a UE monitors a PDCCH. In 3GPP LTE, blind decoding is used to detect the PDCCH. The blind decoding is a scheme in which a desired identifier is de-masked from a CRC of a received PDCCH (referred to as a candidate PDCCH) to determine whether the PDCCH is its own control channel by performing CRC error checking. The UE cannot know about a specific position in a control region in which its PDCCH is transmitted and about a specific CCE aggregation or DCI format used for PDCCH transmission.

A plurality of PDCCHs can be transmitted in one subframe. A UE monitors a plurality of PDCCHs in every subframe. Herein, monitoring is an operation in which the UE attempts to decode the PDCCH to be monitored according to a PDCCH format.

The 3GPP LTE uses a search space to reduce an overload caused by the blind decoding. The search space can also be called a monitoring set of a CCE for the PDCCH. The UE monitors the PDCCH in the search space.

The search space is classified into a common search space and a UE-specific search space. The common search space is a space for searching for a PDCCH having common control information, and may consist of 16 CCEs indexed with 0 to 15. The common search space supports a PDCCH having a CCE aggregation level of $\{4, 8\}$. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Figure 7:
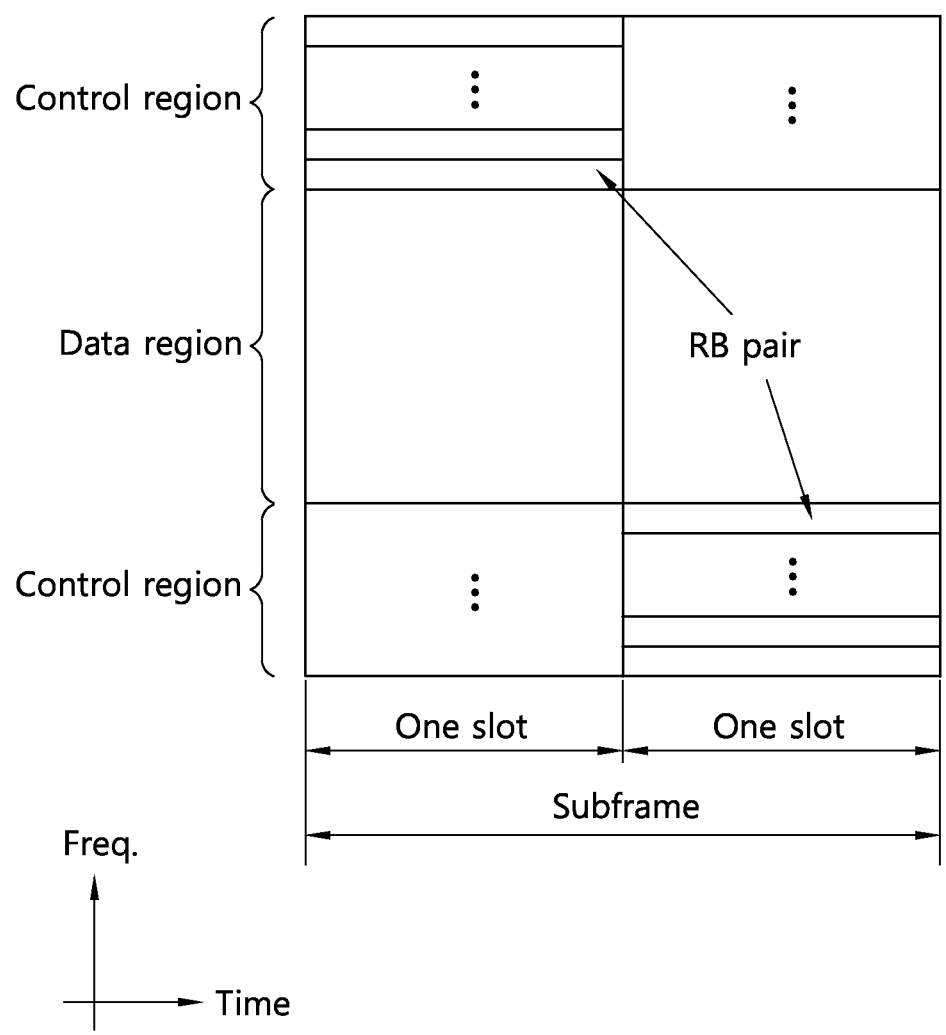
FIG. 7 shows a structure of an uplink (UL) subframe.

FIG. 7 shows a structure of a UL subframe.

Referring to FIG. 7, the UL subframe can be divided into a control region and a data region. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a $1^{st}$ slot and a $2^{nd}$ slot.

Figure 8:
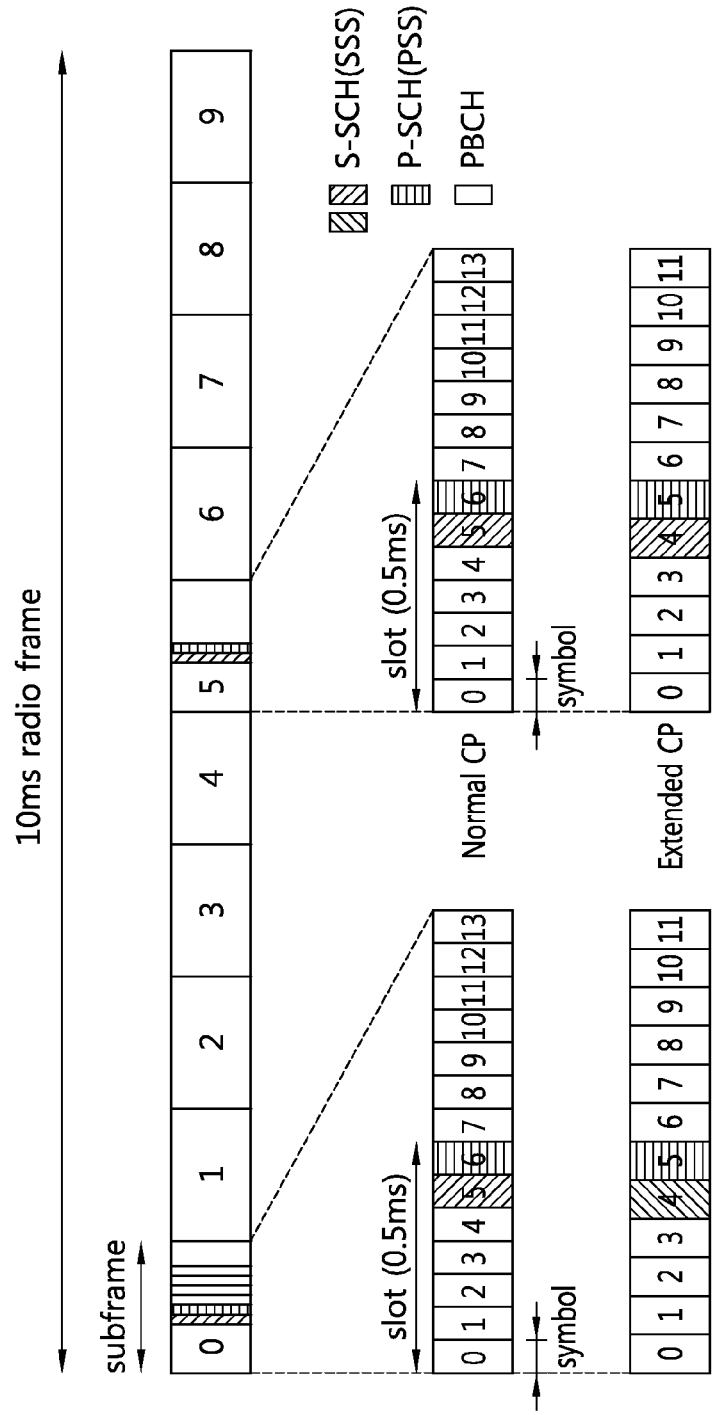
FIG. 8 shows a frame structure for synchronization signal transmission in the conventional FDD frame.

FIG. 8 shows a frame structure for synchronization signal transmission in the conventional FDD frame. A slot number and a subframe number start from 0.

Herein, a synchronization signal is a signal used when a cell search is performed, and includes a primary synchronization signal (PSS) and a secondary synchronization signal (SSS).

The synchronization signal can be transmitted in each of subframes #0 and #5 by considering a global system for mobile communication (GSM) frame length of 4.6 ms to facilitate inter-RAT measurement. A boundary for the frame can be detected through the SSS. More specifically, in the FDD system, the PSS is transmitted in a last OFDM symbol of $0^{th}$ and $10^{th}$ slots, and the SSS is transmitted in an immediately previous OFDM symbol of the PSS. The synchronization signal can transmit 504 physical cell IDs by combining 3 PSSs and 168 SSSs. A physical broadcast channel (PBCH) is transmitted in first 4 OFDM symbols of a $1^{st}$ slot. The synchronization signal and the PBCH are transmitted within 6 RBs in a system bandwidth, so as to be detected or decoded by a UE irrespective of a transmission bandwidth. A physical channel for transmitting the PSS is called a P-SCH, and a physical channel for transmitting the SSS is called an S-SCH.

A transmit diversity scheme of the synchronization signal uses only a single antenna port, and is not separately defined in the standard. That is, single antenna transmission or UE-transparent transmission (e.g., precoding vector switching (PVS), time switched transmit diversity (TSTD), cyclic delay diversity (CDD)) can be used.

For the PSS, a length-63 Zadoff-Chu (ZC) sequence is defined in a frequency domain and is used as a sequence of the PSS. The ZC sequence is defined by Equation 1. A sequence element corresponding to a DC subcarrier, i.e., n=31, is punctured. In Equation 1, Nzc=63.

$$d_u(n) = e^{-j\frac{\pi u n(n+1)}{N_{ZC}}}$$ [Equation 1]

Among 6 RBs (i.e., 72 subcarriers), 9(=72-63) remaining subcarriers are always transmitted with a value of '0', which facilitates a filter design for performing synchronization. To define 3 PSSs, u=25, 29, and 34 are used in Equation 1. In this case, since 29 and 34 have a conjugate symmetry relation, two correlations can be simultaneously performed. Herein, the conjugate symmetry implies the relation of Equation 2 below, and by using this characteristic, a one-shot correlator can be implemented for u=29, 34, and an overall computation amount can be decreased by about 33.3%.

$d^u(n)) = (-1)^n (d_{N_{ZC}-u}(n))^*$, when $N_{ZC}$ is even number.

$d_u(n) = (d_{N_{ZC}-u}(n))^*$, when $N_{ZC}$ is odd number. [Equation 2]

A sequence used for the SSS is used by interleaving two m-sequences having a length of 31. The SSS can transmit 168 cell group IDs by combining two sequences. An m-sequence used as a sequence of the SSS is robust to a frequency selective environment, and can decrease a computation amount according to a fast m-sequence transform using a fast Hadamard transform. In addition, it is proposed to configure the SSS by using two short codes in order to decrease a computation amount of the UE.

Figure 9:
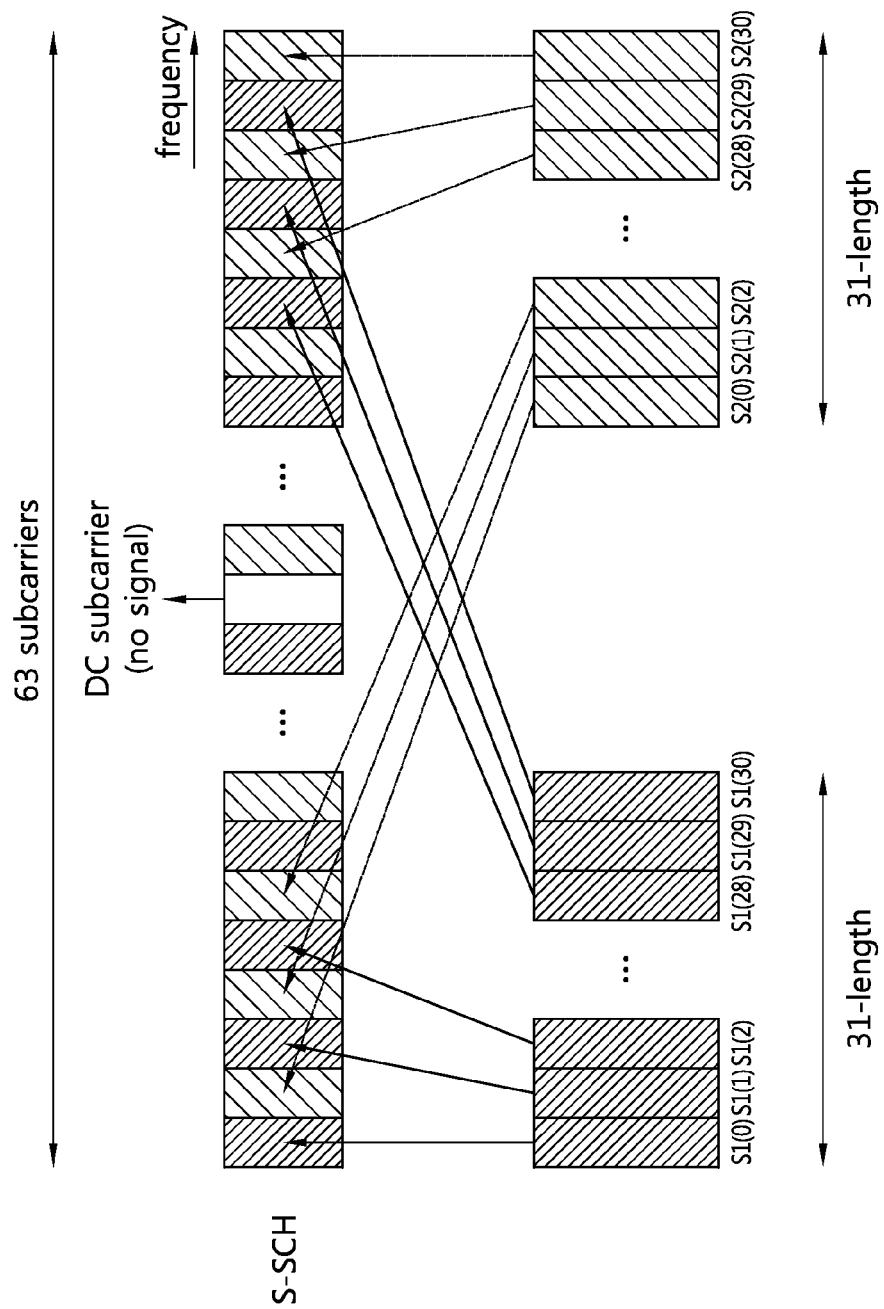
FIG. 9 shows a case where two sequences in a logical domain are interleaved and mapped in a physical domain.

FIG. 9 shows a case where two sequences in a logical domain are interleaved and mapped in a physical domain.

Referring to FIG. 9, when two m-sequences used to generate an SSS code are respectively defined by S1 and S2, if an SSS of a subframe 0 transmits a cell group ID by combining the two sequences (S1, S2), an SSS of a subframe 5 is transmitted by swapping to (S2, S1), thereby being able to identify a boundary of 10 m frame. The SSS code used herein uses a generator polynomial of $x^5+x^2+1$, and 31 codes can be generated by using different circular shifts.

To improve reception performance, two different PSS-based sequences are defined and then are scrambled to an SSS such that different sequences are scheduled to S1 and S2. Thereafter, an S1-based scheduling code is defined, and scheduling is performed on S2. In this case, a code of the SSS is swapped in a unit of 5 ms, whereas the PSS-based scrambling code is not swapped. The PSS-based scrambling code can be defined as a version of 6 circular shifts according to an index of PSS at an m-sequence generated from a generator polynomial of $x^5+x^3+1$. The S1-based scrambling code can be defined as a version of 8 circular shifts according to an index of S1 at an m-sequence generated from a generator polynomial of $x^5+x^4+x^2+x^1+1$.

Figure 10:
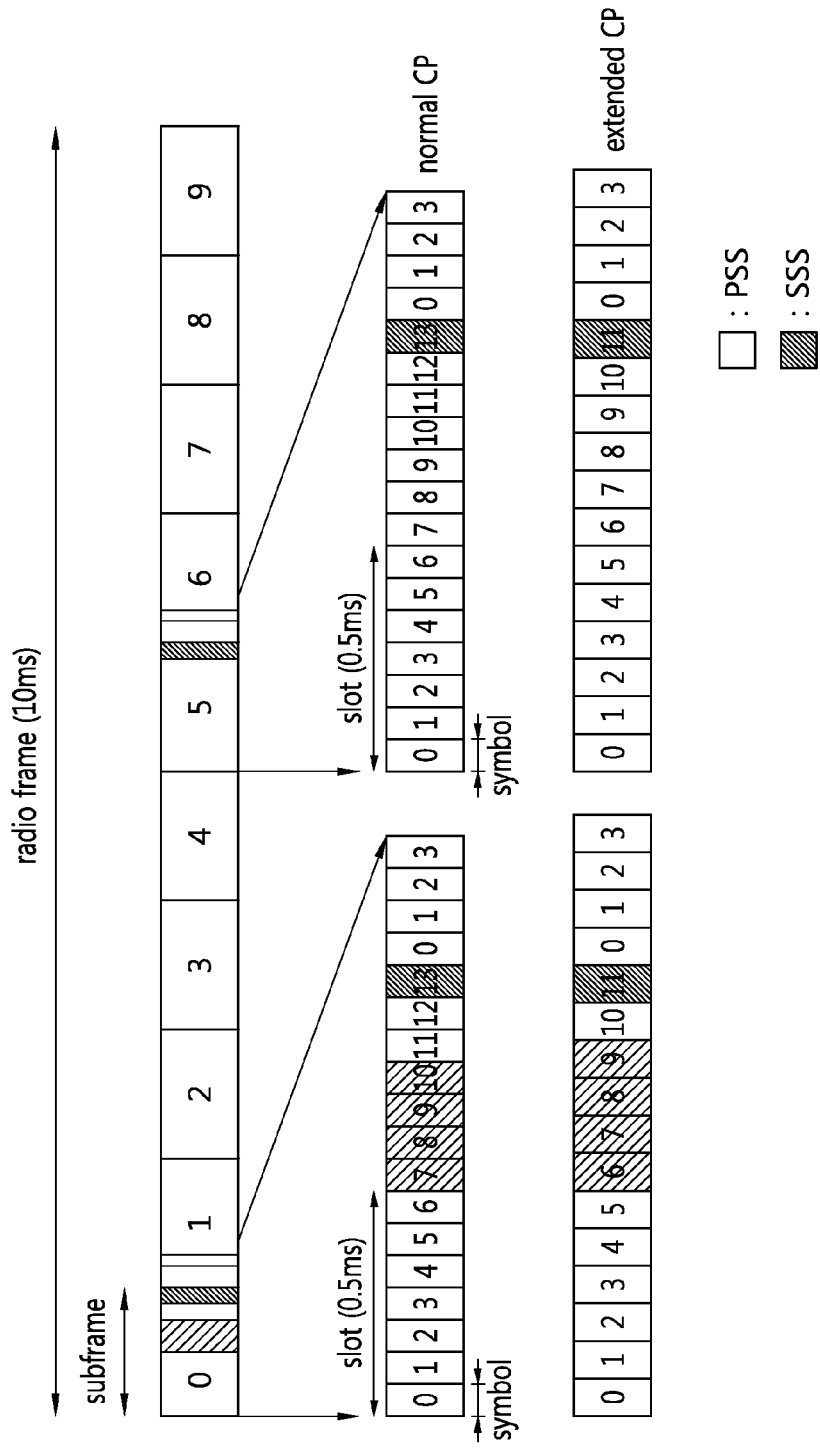
FIG. 10 shows a frame structure for transmitting a synchronization signal in the conventional TDD frame.

FIG. 10 shows a frame structure for transmitting a synchronization signal in the conventional TDD frame.

In a TDD frame, a PSS is transmitted in a $3^{rd}$ OFDM symbol of $3^{rd}$ and $13^{th}$ slots. An SSS is transmitted three OFDM symbols earlier than the OFDM symbol in which the PSS is transmitted. A PBCH is transmitted in first 4 OFDM symbols of a $2^{nd}$ slot of a 1st subframe.

Now, a carrier aggregation system will be described.

Figure 11:
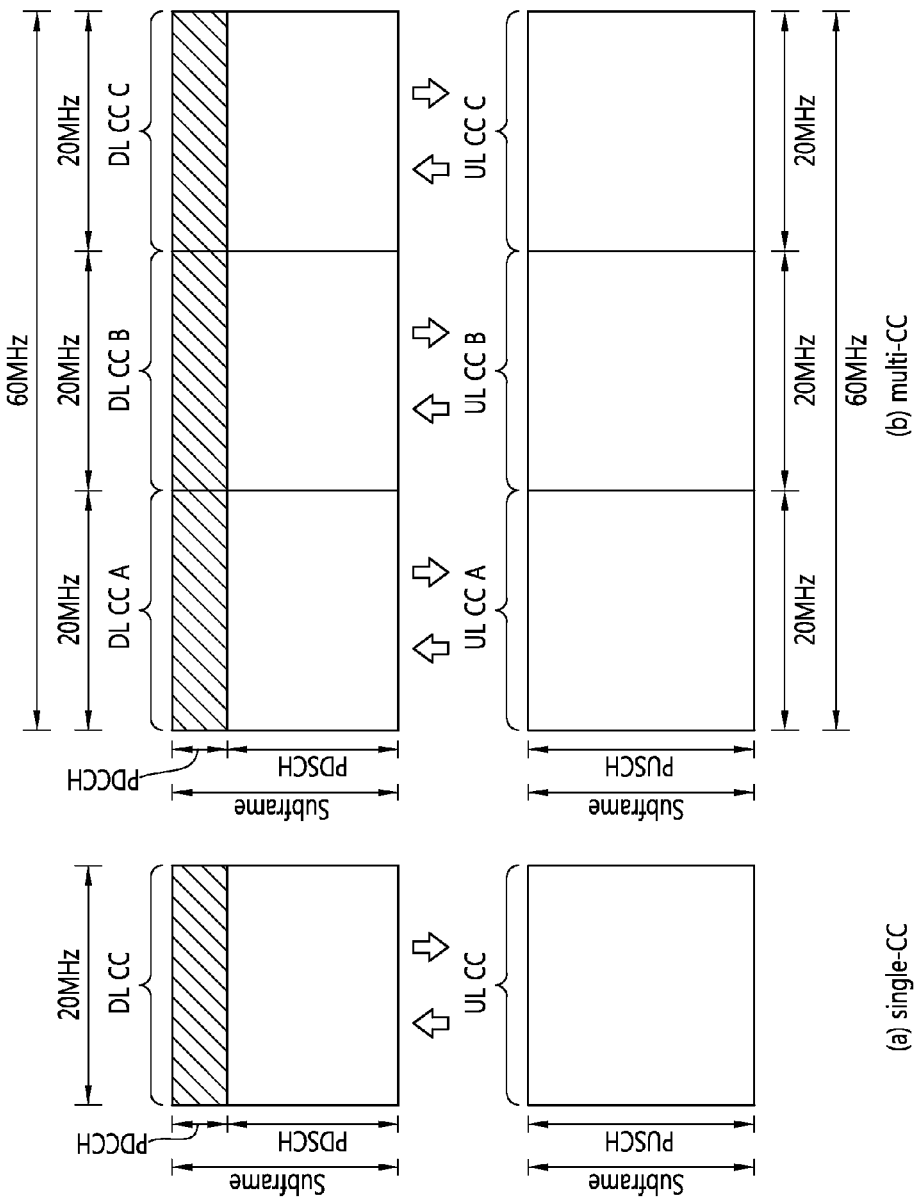
FIG. 11 shows an example of comparing a single-carrier system and a carrier aggregation system.

FIG. 11 shows an example of comparing a single-carrier system and a carrier aggregation system.

Referring to FIG. 11, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

When carrier aggregation is configured, the UE has only one RRC connection with the network. In an RRC connection establishment/re-establishment, handover process, one cell provides non-access stratum (NAS) mobility information and a security input. Such a cell is called a primary cell. In other words, the primary cell implies one serving cell which provides a security input in an RRC connection establishment procedure/connection re-establishment procedure/handover procedure performed by the UE with respect to the BS.

The secondary cell implies a cell configured to provide an additional radio resource after establishing an RRC connection through the primary cell.

The serving cell is configured with the primary cell in case of a UE of which carrier aggregation is not configured or which cannot provide the carrier aggregation. If the carrier aggregation is configured, the term 'serving cell' is used to indicate a cell configured for the UE, and the cell may be plural in number. A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with the BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state. A DL CC corresponding to the secondary cell is called a DL secondary CC (SCC). A UL CC corresponding to the secondary cell is called a UL SCC.

The primary cell and the secondary cell have the following features from a perspective of each UE.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can change by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection process. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system can support multiple component carriers (CCs) unlike a single-carrier system.

Now, a method of transmitting a synchronization signal in a carrier aggregation system will be described.

In case of a carrier aggregation system such as LTE-A, when a UE attempts an initial access, a synchronization signal is used to perform time/frequency synchronization, and thus a subframe boundary and a frame boundary are found. In addition, the synchronization signal is used to track a center frequency and thus a cell ID is acquired.

A primary cell is used for the initial access in the carrier aggregation system. In case of the primary cell, a synchronization signal is transmitted with a period and pattern pre-agreed between a BS and the UE. In addition, since the UE cannot know a bandwidth of each cell in case of the initial access, the synchronization signal is transmitted with a fundamental minimum frequency bandwidth.

The primary cell is a cell capable of data transmission and cell ID provision, system information transmission, and physical control signal transmission, and even if it is used in a stand-alone manner, capable of control signal and data transmission. A secondary cell capable of data transmission/reception only when it is aggregated with the primary cell can be aggregated in the carrier aggregation system. Although a legacy carrier type (LTC) which is the same type as the legacy cell can be used for the secondary cell, a new carrier type (NCT) which does not consider backward compatibility with the legacy cell can also be used. For example, in the NCT, a synchronization signal and/or a PBCH can be transmitted at a position different from that of the LTC.

Figure 12:
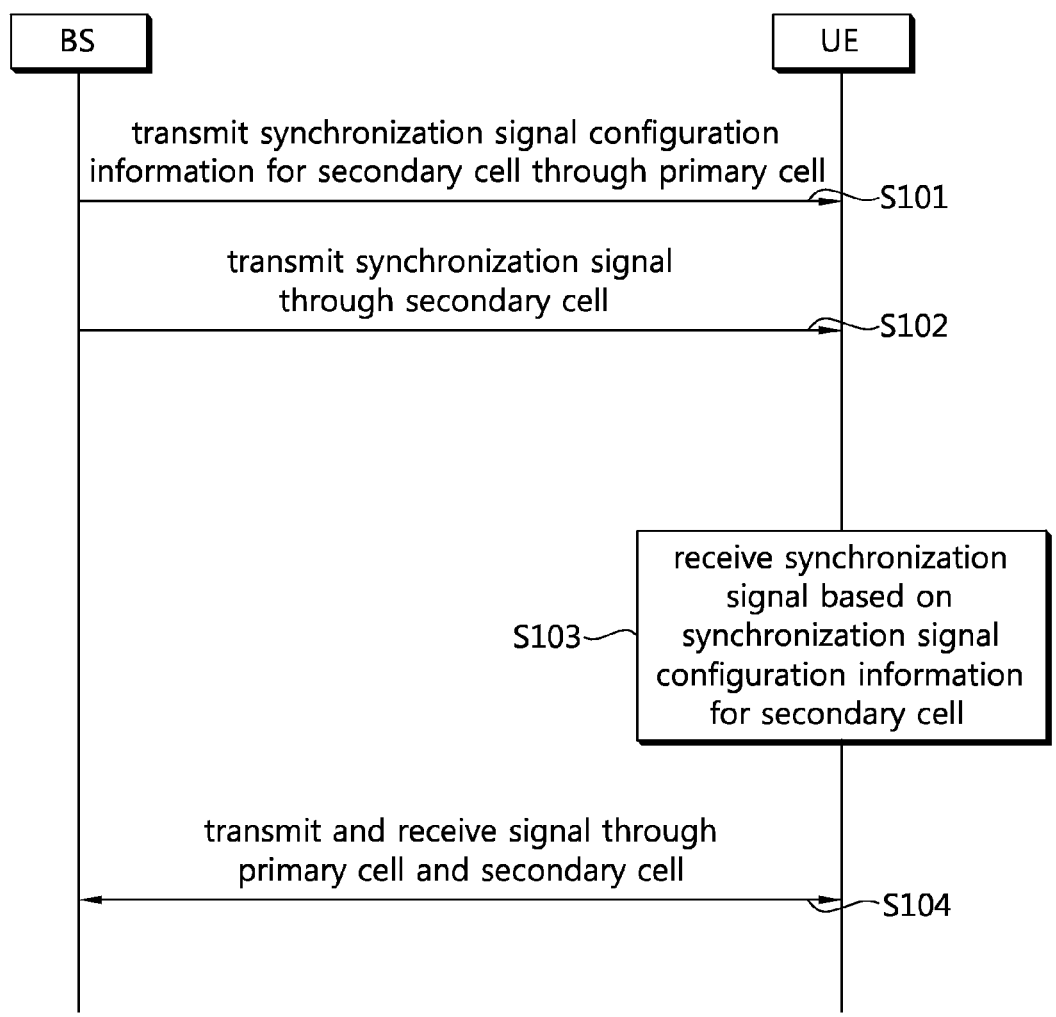
FIG. 12 shows a method of transmitting a synchronization signal in a carrier aggregation system according to an embodiment of the present invention.

FIG. 12 shows a method of transmitting a synchronization signal in a carrier aggregation system according to an embodiment of the present invention. An overview of the present invention will be first described with reference to FIG. 12 and thereafter each step will be described in detail. It is assumed hereinafter that an LCT is used for a primary cell and an NCT is used for a secondary cell.

A BS transmits synchronization signal configuration information for the secondary cell through the primary cell (step S101). That is, conventionally, a synchronization signal configuration for the secondary cell is not flexible and uses the same structure as the primary cell. The reason of using the same structure as described above is that a serving cell used as a secondary cell in a first UE may be used as a primary cell in a second UE. On the other hand, in the present invention, it can be flexibly determined in a primary cell by transmitting synchronization signal configuration information for a secondary cell. The UE may not know in advance about which radio resource is used to transmit the synchronization signal in the secondary cell. In order to solve this problem, in the present invention, the synchronization signal configuration information for the secondary cell is transmitted through the primary cell.

The BS transmits a synchronization signal through the secondary cell (step S102).

The UE receives the synchronization signal on the basis of the synchronization signal configuration information for the secondary cell (step S103).

The BS and the UE transmit/receive signals through the primary cell and the secondary cell (step S104).

Now, synchronization signal configuration information for a secondary cell will be described. The synchronization signal configuration information for the secondary cell can include the following information.

1. A Bandwidth of a Synchronization Signal and/or a Sequence Length of the Synchronization Signal A bandwidth at which the synchronization signal is transmitted or a length of a sequence used in the synchronization signal can be reported by using the synchronization signal configuration information. In other words, the bandwidth at which the synchronization signal is transmitted and the length of the sequence can be flexibly determined by using the synchronization signal configuration information.

The bandwidth at which the synchronization signal is transmitted or the sequence length can be reported either directly or indirectly. For example, a bandwidth of an available synchronization signal and a sequence length can be predetermined according to the bandwidth of the secondary cell. In this case, the BS can report the bandwidth of the secondary cell to indirectly report the sequence length and the bandwidth at which the synchronization signal is transmitted.

A sequence length and a bandwidth at which a synchronization signal is transmitted can use any one of: 1) a method of increasing the sequence length in proportion to an increase in the synchronization signal transmission bandwidth; and 2) a method of increasing an interval between subcarriers to which a sequence is mapped along with an increase in the synchronization signal transmission bandwidth by mapping a sequence to a subcarrier in a comb shape (herein, the comb shape implies that a sequence is mapped to subcarriers having a specific interval, similarly to a case where a sequence is mapped to odd numbered subcarriers) while constantly maintaining the sequence length.

The sequence length and the bandwidth of the synchronization signal can be given in an index form in a table consisting of a combination of candidate groups that can be implemented. For example, a sequence can be configured such that a synchronization signal is transmitted through a full bandwidth of a secondary cell. Alternatively, a sequence that can be applied to a baseband can be defined, and then can be transmitted in sequence in a whole band or can be transmitted by configuring a frequency hopping pattern. In this case, a specific method used for transmission can be provided in an index format.

The synchronization signal transmitted through the whole band can be commonly applied to all UEs which use the secondary cell. Therefore, it can be used for the usage of downlink channel state measurement or channel estimation.

2. Synchronization Signal Transmission Timing

In order to avoid a synchronization signal collision with a neighboring BS which uses the same frequency band, a period by which a synchronization signal for a secondary cell is transmitted, a position of a subframe in a frame, and a position of an OFDM symbol in the subframe can be flexibly determined. For this, synchronization signal transmission timing can be included in synchronization signal configuration information.

The synchronization signal transmission timing may directly indicate a subframe and OFDM symbol in which a synchronization signal is transmitted, or may be given as an offset value for a subframe and OFDM symbol for transmitting an existing synchronization signal, or a combination of the subframe and OFDM symbol offset values.

For example, although a synchronization signal is transmitted in subframes #0 and #5 in an LTE FDD frame, if an offset value is set to 1 for a secondary cell, the synchronization signal is transmitted in subframes #1 and #6.

Alternatively, although a synchronization signal (PSS/SSS) is transmitted in last two OFDM symbols of a first slot in the LTE FDD frame, a transmission position of the synchronization signal of a secondary cell can be moved to first two OFDM symbols of a first slot according to the offset value. Alternatively, the offset value can be given such that an OFDM symbol in which the synchronization signal is transmitted in the secondary cell is not included in a PDCCH region in which a PDCCH is transmitted but is included in a PDSCH region.

Alternatively, a specific subframe of a specific frame can be used to determine a start point, and any period can be set such that each frame has a different subframe in which a synchronization signal is transmitted.

Alternatively, the synchronization signal can be transmitted with a randomized transmission interval pattern. If an unlicensed band is used as a secondary cell, the randomized transmission interval pattern is useful to avoid a synchronization signal collision between systems/vendors which do not coordinate a synchronization signal configuration with each other. If the synchronization signal uses a randomized pattern in time/frequency domains, a BS and a UE can use pre-agreed information.

3. Synchronization Signal Transmission Frequency, Hopping Pattern

A synchronization signal can be transmitted with a hopping pattern instead of being continuously transmitted in some subbands of a system band (i.e., it may not be a subframe including a center frequency) or in a whole band. A candidate group of the hopping pattern can be predetermined in a plural number. An index indicating the hopping pattern can be included in synchronization signal configuration information for a secondary cell.

Three types of information that can be included in the synchronization signal configuration information for the secondary cell is for exemplary purposes only, and thus the present invention is not limited thereto. In addition, the three types of information can be transmitted separately or in combination.

The synchronization signal configuration information can be broadcast or can be transmitted through L1, L2, L3, RRC signaling.

A UE recognizes a time at which the synchronization signal of the secondary cell is transmitted by using the synchronization signal configuration information for the secondary cell. Thereafter, a range of each region can be reconfigured by considering a control channel (PDCCH region, E-PDCCH region) at a time (subframe) at which the synchronization signal is transmitted and a resource occupied by the synchronization signal of a data channel region (PDSCH region). For example, if the synchronization signal is transmitted in an OFDM symbol in a region of a PDCCH indicated by RRC signaling (a start point of a PDSCH of a secondary cell is directly indicated in cross-scheduling) or a PCFICH, a PDCCH region can be extended to a PDSCH region, or a region in which the synchronization signal is transmitted can be excluded from the PDCCH region. Accordingly, a start OFDM symbol of the PDSCH region can be reconfigured. In addition, a region in which data is transmitted in the PDSCH region (i.e., a region excluding a region in which the synchronization signal is transmitted) can be known. Therefore, the UE can decode data by assuming that rate matching or puncturing is performed after a region occupied by a synchronization signal is excluded from a scheduled PDSCH region. Thus, if an E-PDCCH which is a control channel configured to the PDSCH region is configured, it is apparent that a region of the E-PDCCH can be configured by applying the same principle of an operation of configuring the PDSCH region.

Each region's configuration, rate matching, or puncturing through a resource occupied by the synchronization signal can be applied only in a subframe in which the synchronization signal is transmitted or in a subcarrier occupied by the synchronization signal, or can be applied only to a resource block (RB) including the synchronization signal or to a full system band.

An enhanced-PDCCH (E-PDCCH) is a control channel transmitted to the UE in the existing PDSCH region independently from the PDCCH. If the E-PDCCH is configured, one control channel (i.e., a control channel for transmitting DCI) can be transmitted through an E-REG consisting of a group of REs existing in the E-PDCCH region or an aggregation of (one or more) E-CCEs (consisting of a plurality of E-REGs).

In this case, the RE occupied by the synchronization signal may collide with some or all REs constituting the E-REG or the E-CCE. Mapping of a coded DCI symbol, the E-REG, and the E-CCE can be configured according to methods described below.

The methods include: 1) a method of puncturing or rate-matching only a corresponding RE which collides in an E-REG or an E-CCE including the colliding RE; 2) a method of puncturing or rate-matching all E-REGs including the colliding RE in the E-CCE; 3) a method of configuring an E-CCE, except for the all E-REGs including the colliding RE (i.e., the E-REG and the E-CCE are configured after excluding in a unit of the E-REG, not in a unit of the colliding RE); 4) a method of configuring a control channel, except for the all E-CCEs including the colliding RE (the control channel is configured except for the unit of the E-CCE including the colliding RE); or 5) a method of configuring an E-REG and an E-CCE by skipping or avoiding a corresponding RE so as not to overlap with the RE occupied by the synchronization signal.

If a PBCH exists, the same method above can also be applied to a configuration of the E-REG and the E-CCE of an E-PECCH region which collides with an RE occupied by the PBCH.

The aforementioned reconfiguration of the region is also applicable not only to a case of a cell in which a synchronization signal has a flexible position but also to a case of a cell in which a synchronization signal has a fixed position.

In addition, it can be assumed that, if a position of a synchronization signal overlaps with an OFDM symbol/frequency band in which a reference signal (e.g., a cell-specific reference signal (CRS), a channel state information-reference signal (CSI-RS), and a demodulation reference signal (DM-RS)) is located, the reference signal is not mapped to a resource element occupied by the synchronization signal. Alternatively, the reference signal may not be mapped/transmitted in the OFDM symbol in which the synchronization signal is located. Alternatively, the synchronization signal and the reference signal can be configured not to overlap with each other.

If the synchronization signal configuration information for the secondary cell is subject to broadcasting or L1 signaling, aperiodic synchronization signal triggering can be used. The aperiodic synchronization signal triggering is for indicating one subframe in which an aperiodic synchronization signal is transmitted or a plurality of subframes depending on the determined number of transmission attempts. In this case, the BS can transmit the synchronization signal only in the indicated subframe.

The aperiodic synchronization signal triggering can be indicated by transmitting a synchronization signal transmission indication RNTI (SS-RNTI) by masking it to a CRC with a DCI format for a common PDCCH transmitted in a common search space. In this case, the DCI format may include a CIF value of the secondary cell in which the synchronization signal is transmitted. If a time at which the UE receives the PDCCH in the primary cell is denoted by a subframe n, a time at which the synchronization signal is transmitted in the secondary cell may be a subframe n+k (k=0,1).

If the PDSCH is scheduled to the UE by using the DCI format in the subframe n and the synchronization signal configuration information for the secondary cell is received without an error through the PDSCH, a synchronization signal indicated by the synchronization signal configuration information can be transmitted in a subframe n+x. If a time required when the UE receives the PDSCH without an error and transmits a UL ACK response thereof is 'a' subframes, and a time required to perform a next operation after the BS receives the UL ACK response is 'b' subframes, it can be related as x=a+b by considering a+b subframes.

In consideration of an LTE DL HARQ processing timing, in case of FDD, it can be related as a=4, b=4. In case of TDD, 'a' can be set by the following table, and 'b' can be set to b=4.

TABLE 2

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 2 above shows an interval with a DL subframe (i.e., a subframe unit) corresponding to ACK/NACK transmitted in a UL subframe.

Table 3 below is equivalent to Table 2 above, and defines a value 'a' in a case where a UL subframe in which ACK/NACK is transmitted is a subframe n+a when a PDSCH is transmitted in a DL subframe n.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | 7 | 6 | | | 4 | 7 | 6 | | | 4 |
| 2 | 7 | 6 | | 4 | 8 | 7 | 6 | | 4 | 8 |
| 3 | 4 | 11 | | | | 7 | 6 | 6 | 5 | 5 |
| 4 | 12 | 11 | | | 8 | 7 | 7 | 6 | 5 | 4 |
| 5 | 12 | 11 | | 9 | 8 | 7 | 6 | 5 | 4 | 13 |
| 6 | 7 | 7 | | | | 7 | 7 | | | 5 |

It is assumed that a first cell is used as a primary cell for a first UE, and a second cell is used as a secondary cell. It is also assumed that the first cell uses an LCT, and the second cell uses an NCT. In this case, a PBCH for the first UE can be transmitted through the first cell. However, in the above case, the second cell can be used as a primary cell for a second UE. If the second cell is used as the primary cell for the second UE, a PBCH may have to be transmitted also in the secondary cell. However, as described above, in a cell using the NCT, a position at which a synchronization signal and the PBCH are transmitted may be flexible unlike a cell using the LCT.

A method in which the second UE initially accesses to the second cell in this case will be described.

Figure 13:
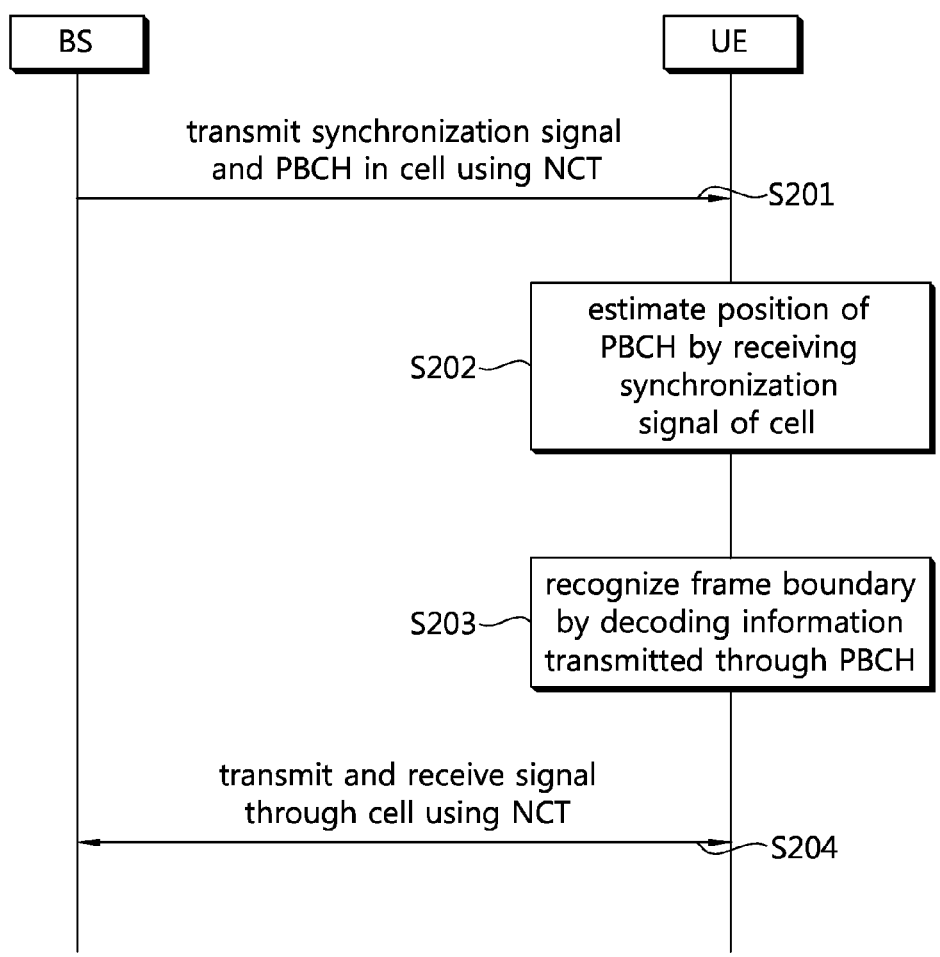
FIG. 13 shows a UE's initial access method when a specific cell uses a new carrier type (NCT).

FIG. 13 shows a UE's initial access method when a specific cell uses an NCT.

Referring to FIG. 13, a BS transmits a synchronization signal and a PBCH in a cell which uses the NCT (step S201).

A UE estimates a position of a PBCH by receiving a synchronization signal of the cell (step S202). Since the synchronization signal can have a flexible position, the UE can detect the synchronization signal by searching a plurality of candidate groups in which the synchronization signal can be located.

If a relative position between the synchronization signal and the PBCH is pre-known to the UE, the UE can estimate a position of the PBCH through the synchronization signal.

The UE recognizes a frame boundary for the cell by decoding information transmitted through the PBCH (step S203). For example, the PBCH may include information indicating the frame boundary (such information can be called frame boundary information), such as a transmission position of the synchronization signal, a relative position with respect to the frame boundary, a position of the synchronization signal in a frame, etc. The UE recognizes/configures the frame boundary through the information indicating the frame boundary.

The UE transmits and receives a signal with respect to the BS through the cell using the NCT (step S204).

That is, the UE receives a synchronization signal by searching for it in the cell using the NCT, estimates a position of a broadcast channel transmitted in the cell on the basis of a synchronization signal, and thereafter receives frame boundary information indicating a frame boundary of the cell in the estimated broadcast channel. Thereafter, the UE recognizes/configures the frame boundary of the cell by decoding the frame boundary information, and thereafter performs signal transmission/reception with respect to the BS.

Figure 14:
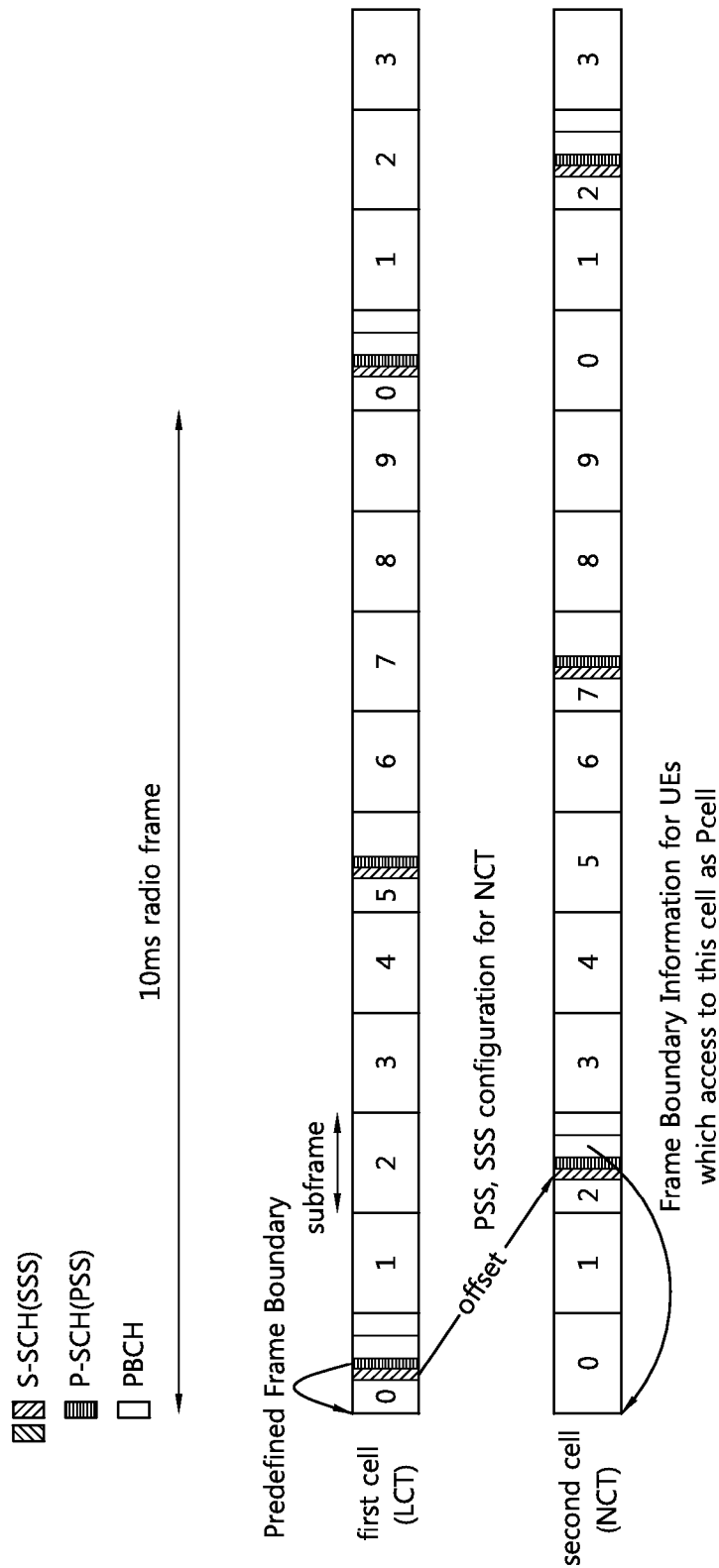
FIG. 14 shows an example of transmitting a synchronization signal and a physical broadcast channel (PBCH) in a legacy carrier type (LTC) cell and an NCT cell.

FIG. 14 shows an example of transmitting a synchronization signal and a PBCH in an LCT cell and an NCT cell.

Referring to FIG. 14, a primary cell (PCell) for a first cell is a first cell and uses a legacy carrier type (LCT), whereas a secondary cell (SCell) is a second cell and uses an NCT. In the secondary cell (i.e., the second cell), a synchronization signal can be shifted in a unit of subframe or OFDM symbol in a time domain with respect to a synchronization signal transmitted in the primary cell (i.e., the first cell). That is, an interval between two OFDM symbols in which a PSS is transmitted in a frame and an interval between two OFDM symbols in which an SSS is transmitted are equally maintained in the primacy cell and the secondary cell, whereas a position at which the PSS is initially transmitted in the frame and a position in which the SSS is initially transmitted varies in each cell in a subframe unit or in an OFDM symbol unit. A first UE can know a synchronization signal position in the second cell by using synchronization signal configuration information for the second cell which is the secondary cell through the first cell which is the primary cell. A PBCH for an initial access of the first UE is transmitted in the first cell which is the primary cell for the first UE.

If the PBCH is transmitted in the second cell which uses the NCT, the PBCH transmitted in the second cell can be transmitted in four OFDM symbols immediately next to a first OFDM symbol in which the PSS is transmitted in the second cell. That is, the PBCH of the secondary cell can also be shifted equally to the synchronization signal. The PBCH transmitted in the second cell may include frame boundary information capable of estimating a frame boundary of the second cell. For example, the frame boundary information may report a time between a subframe or OFDM symbol in which the PSS/SSS is received and a frame boundary or may report at which subframe or OFDM symbol from the frame boundary the PSS/SSS is transmitted.

If the second UE attempts an initial access by using the second cell as the primary cell, the second UE performs decoding by estimating a position of a PBCH of the second cell through a PSS/SSS of the second cell, and thereafter can recognize a frame boundary of the second cell through frame boundary information included in the PBCH.

When a cell which uses the NCT is used as a secondary cell for a specific UE, the BS can signal to the specific UE about whether a PBCH is transmitted in the cell which uses the NCT.

That is, in the above example, the BS can signal the first UE about whether the PBCH is transmitted in the second cell. Then, the first UE can perform an operation of rate matching, puncturing, etc., of another control channel and data channel by considering a resource occupied by the PBCH in the second cell.

In the above example, although the NCT is used as the secondary cell in the first UE, the NCT is used as the primary cell in the second UE. That is, the second UE performs an initial access through the NCT. In this case, the second UE decodes the PBCH by estimating a position of a PBCH through the PSS/SSS in a state where a frame boundary is not recognizable. Thereafter, data can be transmitted and received with respect to the BS after the frame boundary is recognized through the frame boundary information included in the PBCH.

A position of a reference signal for channel estimation and demodulation of the PBCH may also have the same offset value as that of the PBCH. Therefore, the same offset as the offset value of the PSS/SSS can be applied. Alternatively, an offset value that can be estimated indirectly through the PSS/SSS can be applied.

Figure 15:
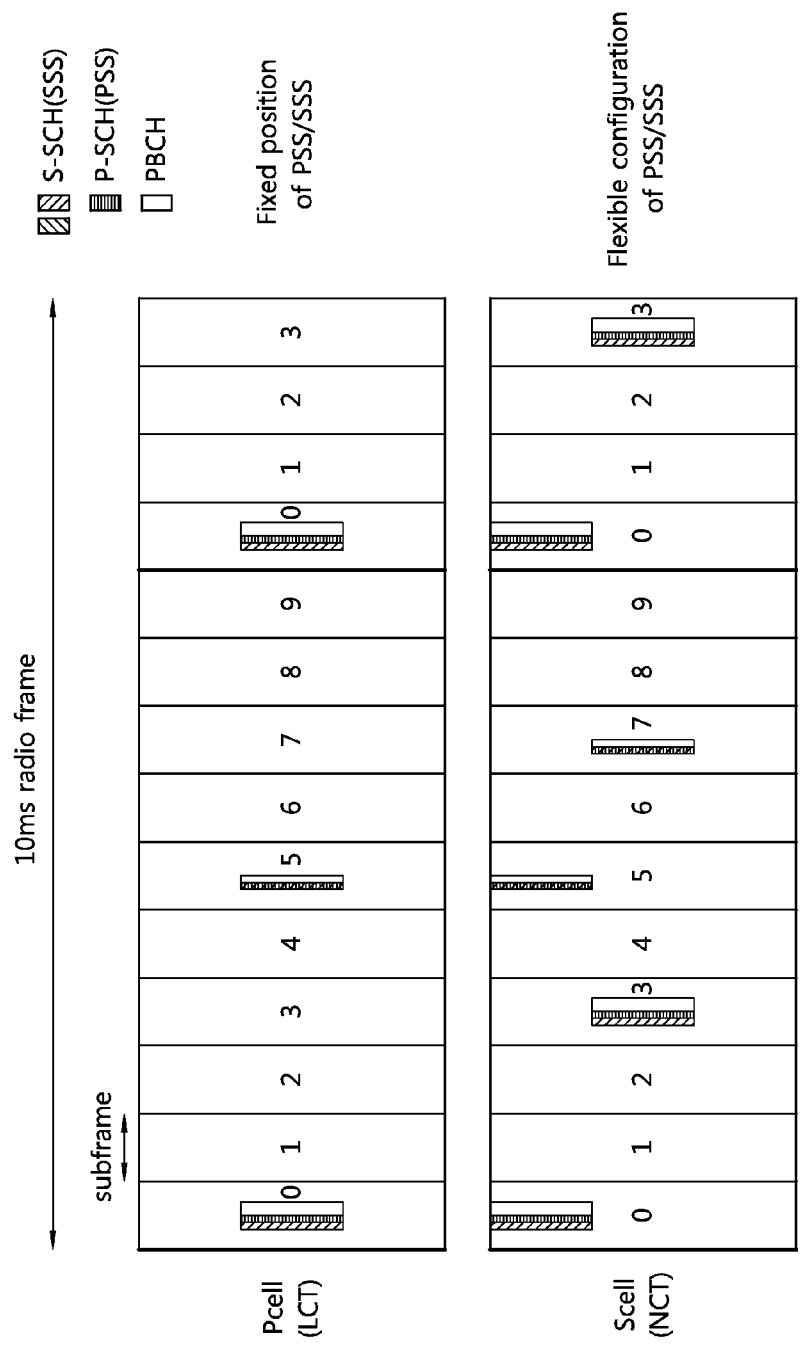
FIG. 15 shows an example of arranging a PBCH and a synchronization signal of a primary cell and a secondary cell.

FIG. 15 shows an example of arranging a PBCH and a synchronization signal of a primary cell and a secondary cell.

Referring to FIG. 15, a synchronization signal and a PBCH are arranged in a primary cell in the same manner as the conventional technique.

On the other hand, a synchronization signal and a PBCH, which are different from those of the primary cell, are arranged in a secondary cell.

A UE can receive information such as a frequency bandwidth, a cell ID, a frame boundary, a CP length, etc., of the secondary cell through the primary cell. Therefore, cell-specific information such as a cell ID is not necessarily included in a synchronization signal of the secondary cell. Accordingly, the synchronization signal of the secondary cell can use an optimal sequence only for time/frequency synchronization.

In case of the conventional LTE, a PSS and an SSS are separated and thus are respectively transmitted. However, in the present invention, only the PSS can be transmitted in case of a secondary cell. Alternatively, instead of the SSS, a PSS can be repetitively transmitted. Alternatively, since the SSS has a relatively great number of orthogonal sequences in comparison with the PSS, only the SSS can be repetitively transmitted. Since cell information such as a cell ID, etc., can be received in the primary cell, SSS detection is attempted only with a known sequence. Therefore, an overhead of detection is not great even if such a method is used.

A configurable set of the synchronization signal of the secondary cell may include a combination having the same configuration as LTE REL-8 so that the UE can access to the secondary cell in a stand-alone manner.

In addition, synchronization signal configuration information for the secondary cell may be commonly applied to the PSS and the SSS or may be applied differently. For example, by the synchronization signal configuration information, the PSS of the secondary cell can be configured to be periodically transmitted with a fixed period, and the SSS can be flexibly configured. Alternatively, on the contrary, the SSS can be configured to be periodically transmitted with a fixed period, and the PSS can be flexibly configured. Alternatively, the PSS can regulate only a period in a time axis, and the SSS can apply subband hopping in a frequency axis.

If the secondary cell has a time/frequency property similar to that of the primary cell, a synchronization signal of the primary cell can also be applied to the secondary cell. In this case, it is also possible not to transmit the synchronization signal in the secondary cell.

Figure 16:
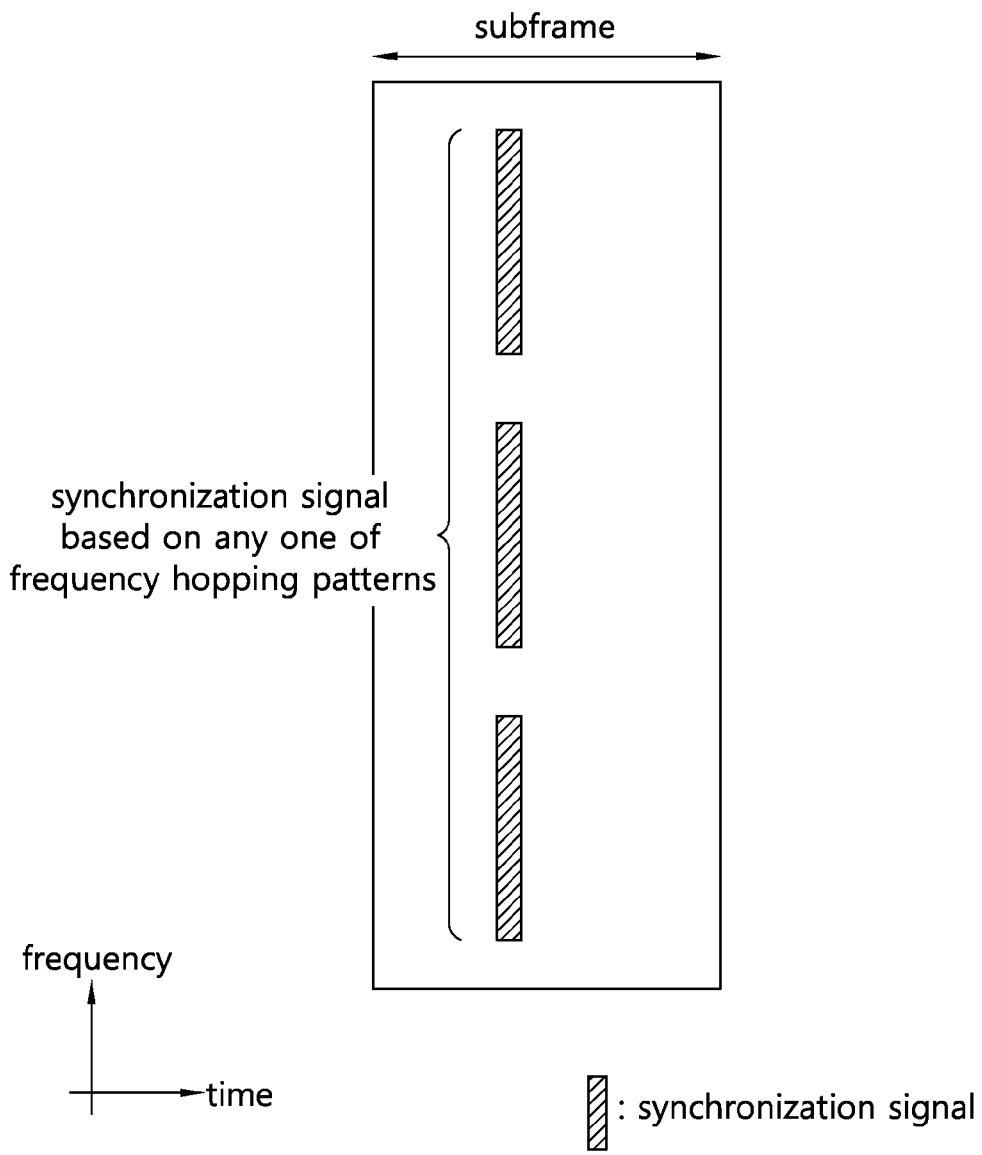
FIG. 16 shows an example of a frequency hopping pattern for a synchronization signal of a secondary cell.

FIG. 16 shows an example of a frequency hopping pattern for a synchronization signal of a secondary cell.

The synchronization signal of the secondary cell can be transmitted by performing frequency hopping non-continuously instead of being transmitted continuously in a frequency domain in a specific subband or a whole band. A configurable frequency hopping pattern can be predefined in a plural number, and synchronization signal configuration information of the secondary cell may include an index indicating a specific frequency hopping pattern.

According to the present invention, in a system in which a frame boundary must be equally maintained between cells such as a TDD system or in cells which perform carrier aggregation, a PSS/SSS can be flexibly configured to facilitate an interference coordination between neighboring cells. In addition, there is an advantage in that, even if the UE does not receive configuration information of the PSS/SSS from the primary cell, it is possible to access to a corresponding cell.

That is, if the NCT is used as the secondary cell, the configuration information of the PSS/SSS and the frame boundary can be received from the primary cell. In addition, if the NCT is used as the primary cell, the frame boundary can be recognized through the PBCH.

Since configuration information for the synchronization signal transmitted to the secondary cell which cannot be used in a stand-alone manner is reported from the primary cell, the synchronization signal of the secondary cell can be effectively configured.

Figure 17:
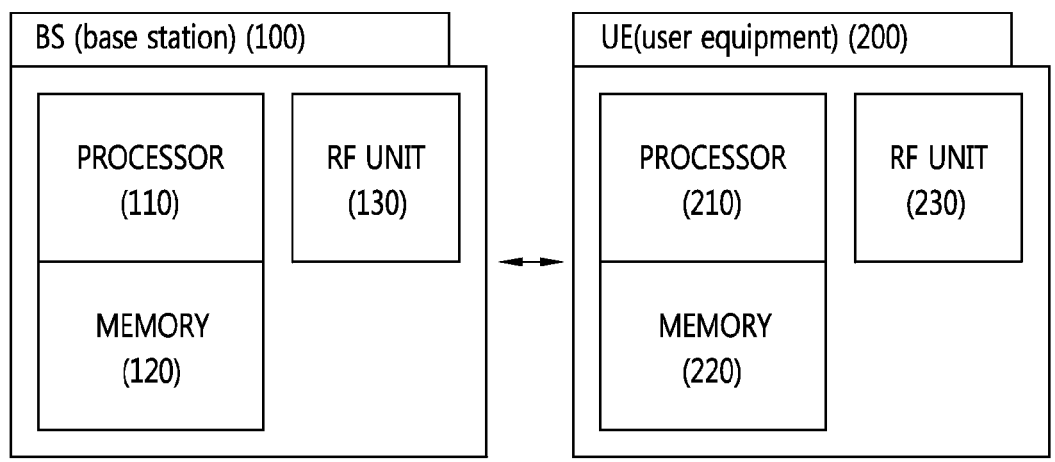
FIG. 17 is a block diagram showing a wireless apparatus for implementing an embodiment of the present invention.

FIG. 17 is a block diagram showing a wireless apparatus for implementing an embodiment of the present invention.

ABS 100 includes a processor 110, a memory 120, and a radio frequency (RF) unit 130. The processor 110 implements the proposed functions, procedures, and/or methods. For example, the processor 110 transmits synchronization signal configuration information for a secondary cell through a primary cell, and transmits a synchronization signal through the secondary cell. A PBCH can be transmitted in the secondary cell. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. For example, the processor 210 receives synchronization signal configuration information for a secondary cell through a primary cell, and synchronizes the secondary cell on the basis of the synchronization signal configuration information. In this case, the primary cell can use an LCT, and the secondary cell can use an NCT. In addition, when initially accessing to a cell using the NCT, the processor 210 detects a synchronization signal in the cell, estimates a position of a broadcast channel transmitted in the cell on the basis of the synchronization signal, and thereafter receives frame boundary information indicating a frame boundary of the cell in the estimated broadcast channel. Thereafter, the frame boundary information can be decoded to recognize/determine the frame boundary of the cell and thus signal transmission/reception can be performed with respect to the BS.

The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of transmitting a synchronization signal in a carrier aggregation system, the method comprising:
   transmitting synchronization signal configuration information for a secondary component carrier (SCC),
   wherein the SCC is an extended component carrier used by a user equipment (UE) in addition to a primary component carrier (PCC), which is a component carrier used by the UE to establish an initial connection with a base station,
   wherein the synchronization signal configuration information of the SCC is transmitted through the PCC, and
   wherein the synchronization signal configuration information includes at least one of synchronization signal bandwidth, a synchronization signal transmission time and a synchronization signal transmission frequency hopping pattern; and
   transmitting the synchronization signal of the SCC through the SCC,
   wherein the synchronization signal of the SCC is determined according to the synchronization signal configuration information transmitted through the PCC, and
   wherein a first synchronization signal transmitted in the PCC includes a primary synchronization signal (PSS) having a sequence length of 63 and a secondary synchronization signal (SSS) having a sequence length of 31, and wherein a second synchronization signal transmitted in the SCC consists of only any one of the PSS and the SSS.

2. The method of claim 1, further comprising transmitting information on at least one of a cell identifier (ID), a bandwidth, a frame boundary, and a cyclic prefix (CP) length of the SCC through the PCC.

3. The method of claim 1, wherein the synchronization signal configuration information includes an offset value, and the offset value indicates an amount by which a position in a frame of a second synchronization signal transmitted in the SCC is shifted in a time domain with respect to a position in a frame of a first synchronization signal transmitted in the PCC.

4. The method of claim 3, wherein the offset value is given in a unit of subframe or orthogonal frequency division multiplexing (OFDM) symbol.

5. The method of claim 1, further comprising transmitting information indicating whether a broadcast channel is transmitted in the SCC through the PCC, wherein information indicating a frame boundary of the SCC is transmitted in the broadcast channel.

6. The method of claim 5, wherein the broadcast channel is transmitted in four OFDM symbols consecutive to a synchronization signal transmitted in the SCC.

7. A user equipment (UE) comprising:
   a radio frequency (RF) unit for transmitting and receiving a radio signal; and
   a processor operatively coupled to the RF unit, wherein the processor is configured to:
   receive synchronization signal configuration information for a secondary component carrier (SCC),
   wherein the SCC is an extended component carrier used by the UE in addition to a primary component carrier (PCC), which is a component carrier used by the UE to establish an initial connection with a base station,
   wherein the synchronization signal configuration information of the SCC is received through the PCC, and
   wherein the synchronization signal configuration information includes at least one of synchronization signal bandwidth, a synchronization signal transmission time and a synchronization signal transmission frequency hopping pattern; and
   receive the synchronization signal of the SCC through the SCC,
   wherein the synchronization signal of the SCC is determined according to the synchronization signal configuration information received through the PCC, and
   wherein a first synchronization signal transmitted in the PCC includes a primary synchronization signal (PSS) having a sequence length of 63 and a secondary synchronization signal (SSS) having a sequence length of 31, and wherein a second synchronization signal transmitted in the SCC consists of only any one of the PSS and the SSS.

8. A method of receiving a synchronization signal in a carrier aggregation system, the method comprising:
   receiving synchronization signal configuration information for a secondary component carrier (SCC),
   wherein the SCC is an extended component carrier used by a user equipment (UE) in addition to a primary component carrier (PCC), which is a component carrier used by the UE to establish an initial connection with a base station,
   wherein the synchronization signal configuration information of the SCC is received through the PCC, and wherein the synchronization signal configuration information includes at least one of synchronization signal bandwidth, a synchronization signal transmission time and a synchronization signal transmission frequency hopping pattern; and
receiving the synchronization signal of the SCC through the SCC,
wherein the synchronization signal of the SCC is determined according to the synchronization signal configuration information received through the PCC, and
wherein a first synchronization signal transmitted in the PCC includes a primary synchronization signal (PSS) having a sequence length of 63 and a secondary synchronization signal (SSS) having a sequence length of 31, and wherein a second synchronization signal transmitted in the SCC consists of only any one of the PSS and the SSS.

* * * * *